(12) United States Patent
Hyslop

(10) Patent No.: US 7,104,881 B1
(45) Date of Patent: Sep. 12, 2006

(54) LOCATOR RING INSERT WITH BAFFLES

(76) Inventor: William J. Hyslop, 105 Jefferson Valley, Coatesville, IN (US) 46121

(*) Notice: Subject to any disclaimer, the term of this patent is extended or adjusted under 35 U.S.C. 154(b) by 0 days.

(21) Appl. No.: 11/155,284

(22) Filed: Jun. 17, 2005

(51) Int. Cl.
*F16L 25/00* (2006.01)

(52) U.S. Cl. .......................... 454/63; 285/9.1; 285/24; 285/62; 138/39

(58) Field of Classification Search ............... 454/63, 454/64; 285/9.1, 148.26, 417, 369, 62, 24; 239/289, 600; 141/383, DIG. 1; 138/39; 60/770
See application file for complete search history.

(56) References Cited

U.S. PATENT DOCUMENTS

| | | | | |
|---|---|---|---|---|
| 2,864,406 A | * | 12/1958 | Schewel | 239/505 |
| 4,019,537 A | * | 4/1977 | Bonnard et al. | 138/37 |
| 4,906,032 A | * | 3/1990 | Hohman | 285/319 |
| 5,096,230 A | * | 3/1992 | Pausch et al. | 285/9.1 |
| 5,330,234 A | * | 7/1994 | Sweeny | 285/62 |
| 5,362,273 A | * | 11/1994 | Pfeiffer et al. | 454/63 |
| 5,927,759 A | | 7/1999 | Hyslop | 285/9.1 |
| 2005/0045419 A1 | * | 3/2005 | Choi et al. | 181/270 |

* cited by examiner

*Primary Examiner*—Gregory Wilson
(74) *Attorney, Agent, or Firm*—Woodard, Emhardt, Moriarty, McNett & Henry LLP

(57) ABSTRACT

A connection assembly for an exhaust extraction system which is designed to vent the exhaust from a vehicle tail pipe includes, in combination, three primary components. One component is an annular sleeve which is constructed and arranged to assemble onto the vehicle exhaust pipe. Next, there is a nozzle locator ring which slides onto the annular sleeve such that one end of the sleeve extends beyond one side of the nozzle locator ring and the opposite end of the sleeve extends beyond the opposite side of the nozzle locator ring. The third component is an exhaust nozzle assembly which includes a generally cylindrical nozzle and a pair of magnet packs located circumferentially 180 degrees apart. An extension sleeve inserted into the annular sleeve includes a series of baffles to deflect and direct vehicle exhaust.

6 Claims, 5 Drawing Sheets

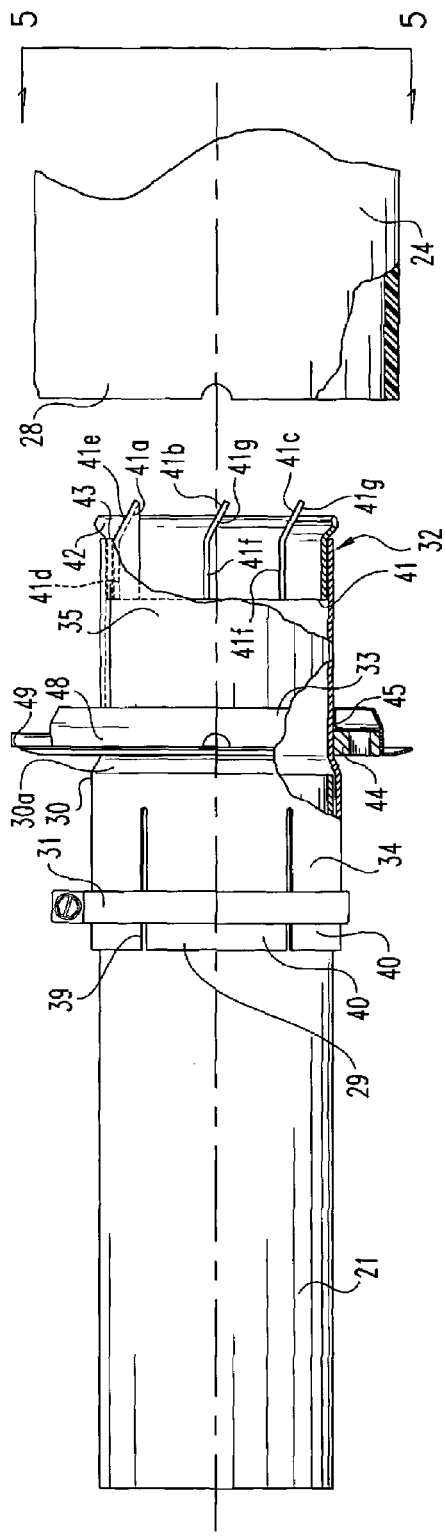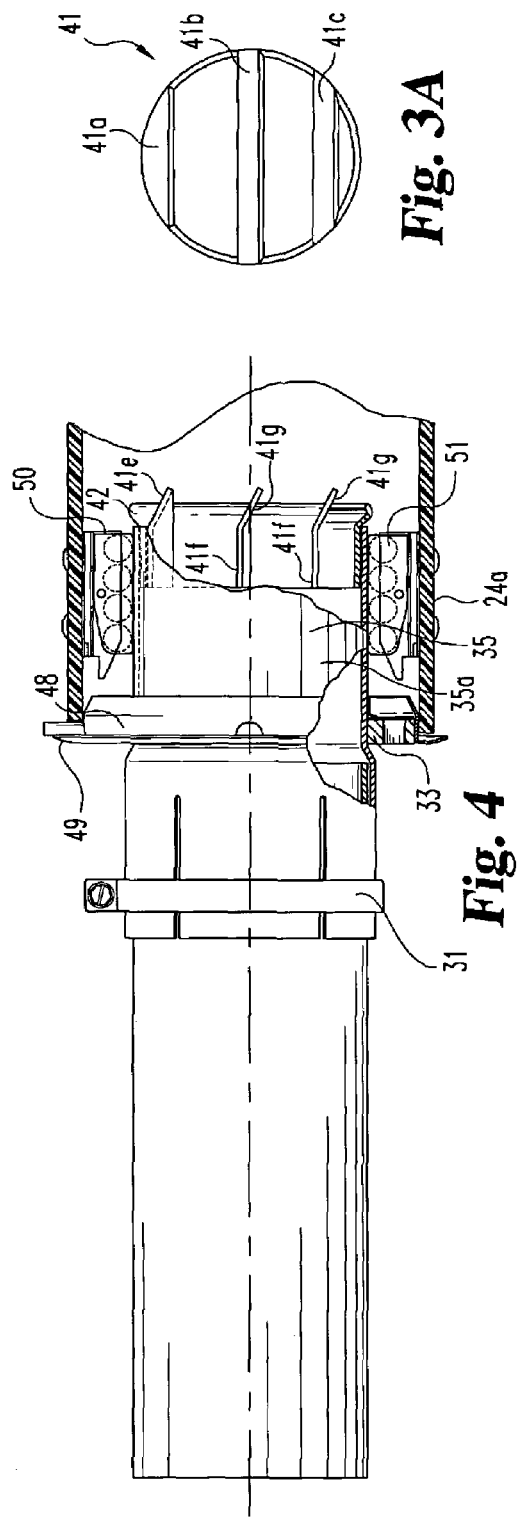

LOCATOR RING INSERT WITH BAFFLES

BACKGROUND OF THE INVENTION

The present invention relates in general to exhaust extraction systems for emergency vehicles, such as a fire truck or ambulance. More particularly, the present invention relates to the design of an extension sleeve that includes baffles to deflect and direct the vehicle exhaust.

Emergency vehicles, such as a fire truck, create an interesting exhaust-removal challenge due to the nature and manner of use of the vehicle in preparation for an emergency run. A fire truck is usually backed into the fire house garage bay and readied for its next run in this manner. When an alarm call comes in, the engine of the fire truck is started by the driver while he waits for everyone to put on their turn out gear and get on board. During this brief time interval before the truck leaves the station, the engine is cold and generates the dirtiest exhaust gases which need to be vented to the outside atmosphere.

The exhaust system of a fire truck is typically arranged so that the "tail" pipe exits from the right side of the truck in front of the rear axle. While this location places the exiting exhaust gases near the center of the fire house, it is an advantageous location for present day exhaust extraction systems. For the most part these present day exhaust extraction systems use a flexible exhaust hose which is connected at one end to the fire truck exhaust pipe and at the opposite end to an overhead duct which leads out of the fire house. A high pressure blower is used to forcibly remove the exhaust gases from the fire house. A hose adapter or nozzle assembly of some type is typically used to connect the flexible hose to the exhaust pipe. With secure and sealed connections and so long as there are no perforations or open seams in the exhaust extraction system, all of the vehicle exhaust gases will be safely vented out of the fire house and into the atmosphere. The use of a flexible hose to remove exhaust gas from a running engine is not new. Automobile mechanics have used such hoses for years. However, there is one important difference between use by a mechanic and use as part of an exhaust extraction system which is attached to an exhaust pipe of a fire truck. Once everyone is onboard the fire truck, it is ready to leave the fire house and there is usually no one left to disconnect the exhaust hose from the exhaust pipe. Even if personnel were left behind, safe handling of the vehicle exhaust would dictate that the vehicle be pulled out of the fire house and then have the hose removed. This would involve a start up and stop procedure at the very time the fire truck is trying to leave quickly on the emergency run. Even if someone was left behind and could disconnect the exhaust hose prior to the fire truck departing, this would allow exhaust gas to be dispersed into the fire house, the very event which exhaust extraction systems are designed to prevent.

In order to address this disconnect concern, present day exhaust extraction systems try to provide an automatic disconnect feature such that the adapter or nozzle connecting the flexible hose to the exhaust pipe comes off automatically after the fire truck has reached the door of the fire house. While present exhaust extraction systems which are offered commercially have approached this design challenge in slightly different ways, most systems provide an extra length of flexible hose which is held by a saddle and suspended from an overhead track by means of a spring-biased balancer. The spring-biased balancer supports the hose and the induced spring-tension force facilitates the release of the hose from the exhaust pipe as the fire truck leaves the fire house. As the fire truck begins to pull out of the fire house, the distance between the exhaust pipe and the duct work connection increases. This pulls on the flexible hose which in turn pulls the balancer down the track toward the door. The loop of excess hose between the balancer saddle and the duct hose connection allows this movement. When the balancer reaches the track stop, the balancer cable begins to uncoil which increases the resisting spring force. At some point, the resisting spring force of the balancer becomes greater than the force needed to separate the adapter from the exhaust pipe. Continued travel of the fire truck causes the hose adapter/nozzle to separate from the exhaust pipe.

In 1999, U.S. Pat. No. 5,927,759 was issued to Hyslop and is directed to a unique connection assembly for an exhaust extraction system. The structure disclosed in the '759 patent is disclosed herein as part of the description of the present invention.

In terms of fire truck exhaust pipe arrangements, some vehicles include a curved or angled section that directs the exhaust downwardly and rearwardly in the direction of the rear wheel. When this style of exhaust system is to be fitted with the style of connection assembly disclosed in the '759 patent, it is necessary to cut off the curved or angled section of the exhaust pipe. This is required because the annular sleeve component of the '759 patent is designed to fit onto a straight, cylindrical pipe section, not a curved or angled section.

Once this curved or angled section is removed, the vehicle exhaust is directed outwardly from the side of the vehicle, not downwardly and rearwardly as is desired. While there is no issue or concern when the flexible exhaust hose is connected, the problem arises when the exhaust hose and nozzle (24) of the '759 device are pulled free as the fire truck leaves the fire house. Once these portions are pulled off, what is left is a straight conduit assembly connected to the straight pipe section. As such, the fire truck exhaust is directed outwardly, not downwardly and rearwardly. As fire fighters have to work around the fire truck, directing the hot exhaust outwardly instead of downwardly and rearwardly is a problem that needs a solution.

The present invention provides an improvement to the '759 patent, by configuring the insert sleeve that remains with the fire truck with a series of baffles that allow the fire fighters to orient the insert sleeve and thereby direct the baffles so that the exhaust is deflected and directed in the desired direction, preferably downwardly and/or rearwardly.

BRIEF SUMMARY OF THE INVENTION

A connection assembly for an exhaust extraction system which is designed to vent the exhaust from a vehicle tail pipe according to one embodiment of the present invention comprises in combination a sleeve which is constructed and arranged to assemble onto the vehicle tail pipe, a nozzle locator ring which is constructed and arranged to assemble onto the sleeve, such that the sleeve extends through the nozzle locator ring, an extension sleeve inserted into the sleeve, and an exhaust nozzle assembly which is constructed and arranged to assemble onto the nozzle locator ring. The extension sleeve can be rotated and it includes a plurality of baffles to deflect and direct the vehicle exhaust in the preferred direction.

One object of the present invention is to provide an improved connection assembly for an exhaust extraction system.

Related objects and advantages of the present invention will be apparent from the following description.

BRIEF DESCRIPTION OF THE SEVERAL VIEWS OF THE DRAWINGS

FIG. 3 is an exploded, side elevational view of a sleeve and nozzle locator ring assembly which comprise other portions of the FIG. 1 connection assembly.

FIG. 3A is an end elevational view of an extension sleeve that comprises one part of the FIG. 3 sleeve and nozzle locator ring assembly.

FIG. 4 is a fragmentary, top plan view of the FIG. 2 nozzle assembly assembled to the FIG. 3 sleeve and nozzle locator ring assembly

DETAILED DESCRIPTION OF THE INVENTION

Figure 1:
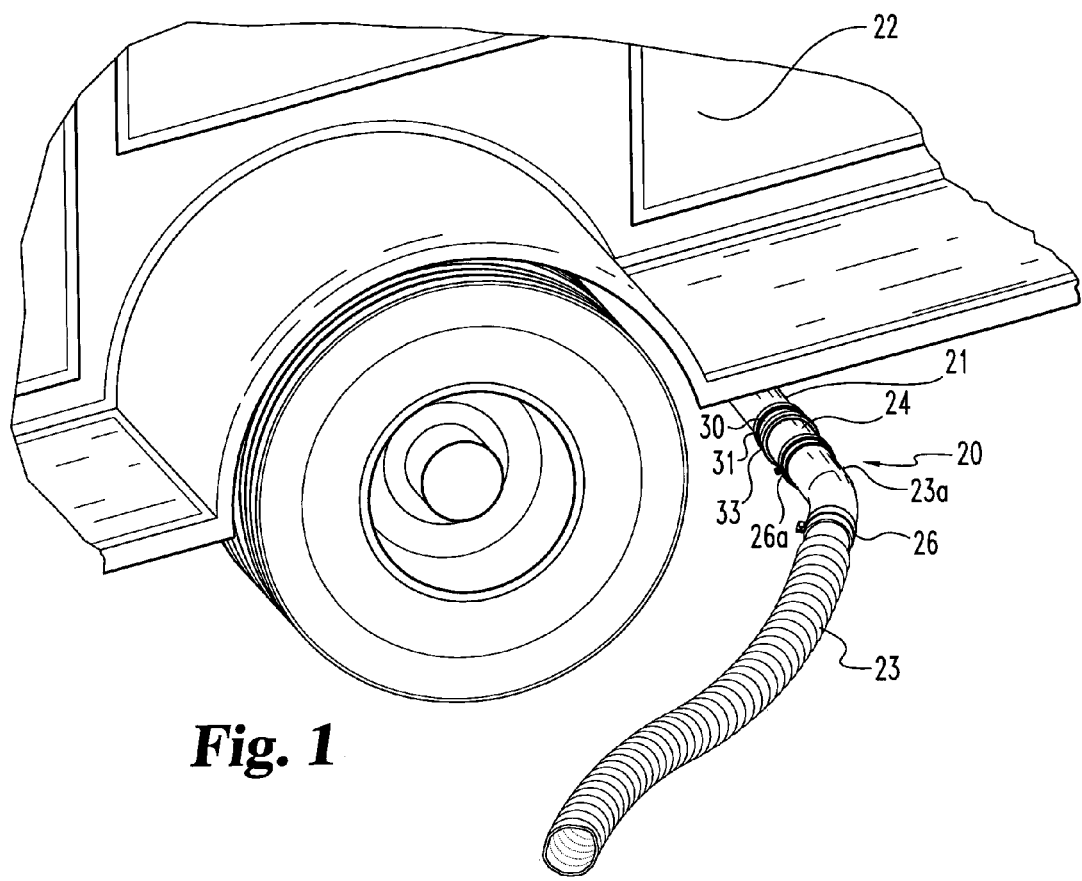
FIG. 1 is a perspective view of a connection assembly for an exhaust extraction system according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
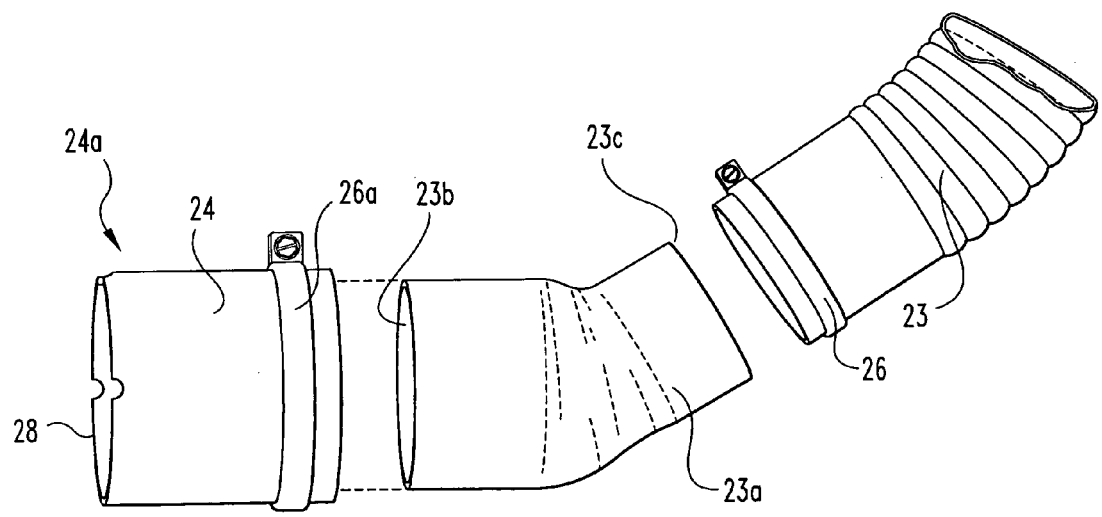
FIG. 2 is an exploded, side elevational view of a nozzle assembly which comprises one part of the FIG. 1 connection assembly as connected to an elbow and flexible hose.

Referring to FIGS. 1 and 2 there is illustrated a portion of an exhaust extraction system 20 which is connected to the exhaust pipe 21 of a fire truck 22. The flexible hose 23 of the exhaust extraction system 20 terminates at a 45 degree metal elbow 23a and hose 23 is connected and secured to elbow 23a by means of annular band clamp 26. One generally cylindrical end 23b of elbow 23a fits inside of the flexible, generally cylindrical rubber nozzle 24 and is securely connected therewith by annular band clamp 26a. A nozzle locator ring 33 is securely attached to the exhaust pipe 21 by way of a connecting sleeve 30 and remains fixed thereto. The free end 28 of nozzle 24 fits over one end of the nozzle locator ring 33 and this interface denotes the point of separation when the exhaust extraction system disconnects from the fire truck 22. As will be explained and described, two magnet packs are assembled into nozzle 24 so as to create a nozzle assembly 24a.

The exhaust pipe 21 is configured so as to extend from the right side of the fire truck 22, near the rear axle. The exhaust pipe 21 is typically cylindrical, and it is often fitted with an angled extension in order to direct the exhaust toward the right rear wheel. Earlier extraction systems would often cut, modify, and angle the exhaust pipe at a 45 degree angle. This tended to facilitate the ease of separation of the nozzle from the exhaust pipe when the fire truck leaves the fire house. As will be explained hereinafter, the exhaust pipe is modified for cooperation with the present invention by being shortened. According to the present invention, a cylindrical connecting sleeve is used and is fitted around the end portion of the shortened exhaust pipe. The sleeve replaces the portion of the exhaust pipe that was cut off or removed and the sleeve extends the exhaust pipe approximately one inch beyond the side of the fire truck 22. Size variations are offered for the sleeve 30 in order to adapt sleeve 30 to the specific size of the vehicle exhaust pipe. Specifically, the diameter of end 29 is changed to fit the corresponding exhaust pipe.

The remainder of the exhaust extraction system 20 which is not illustrated in FIG. 1 can assume a variety of configurations, depending on the specific brand or model which is being used in the particular fire house. However, a typical exhaust extraction system will include a high pressure blower, a round sealed duct, flexible hose of adequate length to extend between the system and the vehicle as it leaves the fire house, a saddle, a hose support balancer, and a cooperating balancer track. Since existing exhaust extraction systems which are available commercially are believed to be well known to persons of ordinary skill in this field, the system details need not be illustrated. Various companies have been identified which offer such systems and their product literature illustrates to some extent these other components and confirms that these exhaust extraction systems are well known to persons of ordinary skill. Further, the only aspect of such commercial systems which is applicable to the present invention is the flexible hose 23. The flexible hose 23 and the end of the hose which terminates into nozzle 24 will typically have the same size, shape, and overall configurations, regardless of the exhaust extraction system. The typical diameter sizes will be 4.0, 5.0 or 6.0 inches.

With continued reference to FIG. 2, the details of the connection of nozzle 24 to hose 23 via elbow 23a are provided. Nozzle 24 is a hollow, generally cylindrical member which is closely fitted around end 23b. Clamp 26a is tightened so that the nozzle-to-elbow connection is leak-free. The flexible hose 23 is closely fitted over the smaller end 23c of the elbow 23a. Clamp 26 is tightened so that the hose-to-elbow connection is leak-free.

It is also to be noted that nozzle 24 has a relatively thick wall but it is still flexible and able to be manually shaped, to some extent, as it is pushed onto the nozzle locator ring 33. Locator ring pins are provided and nozzle 24 includes relief cutouts at 3 o'clock, 9 o'clock, and 12 o'clock so as to engage the corresponding pins.

The assembly of the primary components associated with the present invention is illustrated in FIG. 3. As illustrated in this exploded view, the exhaust pipe 21 inserts into a first end 29 of sleeve 30 and is secured by annular band clamp 31. The nozzle 24 extends over the opposite end 32 of the sleeve and fits snugly onto the body of the nozzle locator ring 33. Sleeve 30 is a one-piece member with a larger diameter portion 34 on one side of ring 33 and a smaller diameter portion 35 on the opposite side of ring 33 with an angled offset portion 30a between portions 34 and 35. End 29 of portion 34 is configured with six slots 39 which ease the fit and the insertion of the exhaust pipe 21 into end 29. Once the exhaust pipe 21 is securely and fully inserted into end 29, clamp 31 is tightened which is achieved by reducing the diameter size. The six individual prongs 40, which are defined by the six slots 39, close in on the outside diameter surface of the exhaust pipe as the clamp 31 is tightened.

At the opposite end 32 of sleeve 30, an extension sleeve 41 is bolted to the inside diameter surface of portion 35. Sleeve 41 has a cylindrical portion which fits inside end 32 and an outwardly flared, conical portion 42 which extends beyond the free edge 43 of portion 35. The interior of extension sleeve 41 is configured with a series of equally-spaced, unitary baffles 41a, 41b and 41c. In the preferred embodiment of the present invention, there are three baffles, but this number can increase or decrease in accordance with what is contemplated for the present invention. Each baffle is securely welded to the inside diameter of extension sleeve 41. The uppermost baffle 41a includes a curved portion 41d that fits up against the inside diameter of sleeve 41 and an angled plate portion 41e. The other two baffles 41b and 41c each include a substantially flat, generally rectangular plate portion 41f and an angled plate portion 41g. While plate portion 41f is substantially parallel with the longitudinal axis of extension sleeve 41, plate portion 41g is set at an angle of at least 25 degrees, and is preferably between 25 and 60 degrees relative to the longitudinal axis of extension sleeve 41, see FIGS. 3, 3A, and 4.

Figure 7:
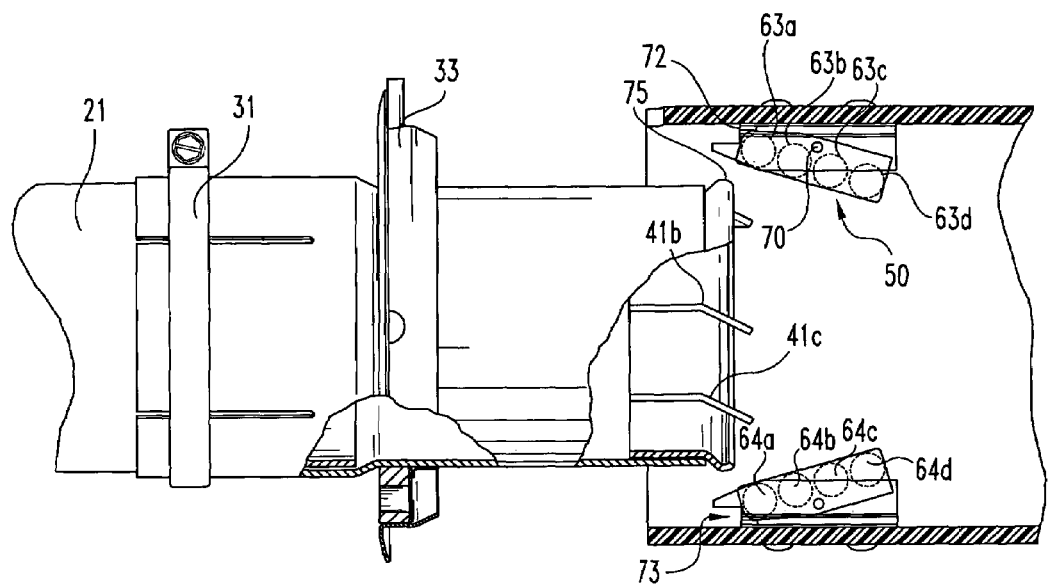
FIG. 7 is a fragmentary, side elevational view of the FIG. 2 nozzle assembly as being installed onto the FIG. 3 sleeve and nozzle locator ring assembly.
Figure 7A:
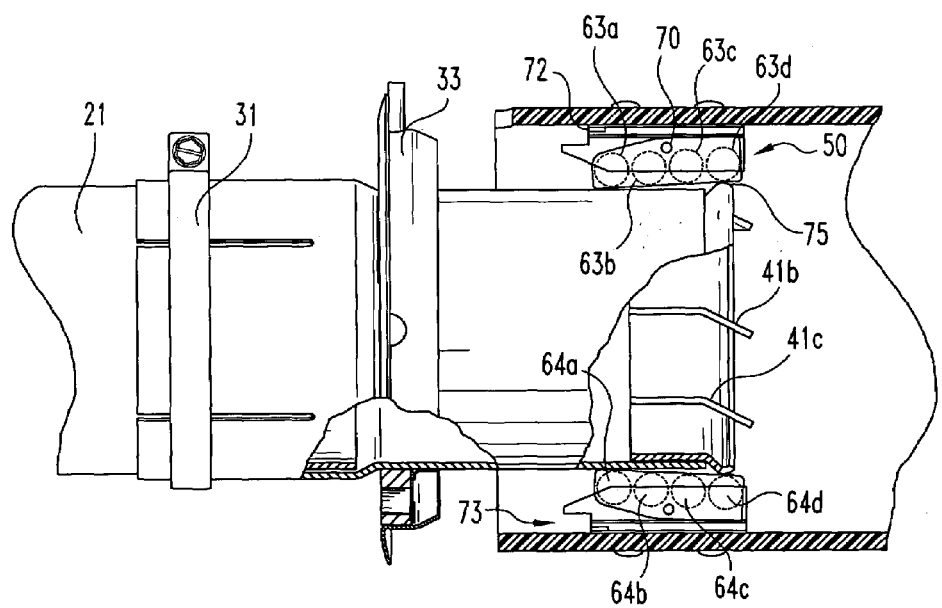
FIG. 7A is a fragmentary, side elevational view of the FIG. 7 assembly procedure at a later point in time prior to when the nozzle assembly is fully assembled.

In the FIG. 3A end view illustration, it will be seen that the baffles 41a–41c are each oriented relative to sleeve 41 so that the bend line between portion 41d and portion 41e and between portion 41f and portion 41g are substantially horizontal and thus parallel to the ground. This then orients each portion 41e and 41g with a downward angle of incline. Nevertheless, it will be understood that extension sleeve 41 can be rotated a full 360 degrees relative to exhaust pipe 21 before being bolted in the desired location. This allows the end user, installer and/or fire fighter to orient the baffles 41a–41c off of horizontal. With each baffle 41a–41c welded into position with an approximate 25 degree angle in a downward direction (see FIG. 3), this causes the exiting exhaust from the vehicle (fire truck) to be deflected and directed in a downward direction. By rotating extension sleeve 41 prior to installing the mounting bolts, the baffles 41a–41c are able to be used to change the direction of the deflected exhaust. If left in the horizontal position of FIG. 3A, the exhaust is directed in a downward direction with its angle determined by the angle of the angled plate portions 41e and 41g. Turning extension sleeve 41 forty-five degrees, clockwise on a passenger side exhaust pipe, from the horizontal orientation causes the exiting exhaust to be directed downwardly and rearwardly. The balance between the exhaust that flows in a downward direction, as compared to a rearward direction, will be affected not only by the orientation of extension sleeve 41, but by the angle of the plate portions 41e and 41g. By turning the extension sleeve 41 ninety degrees, the exhaust is directed parallel to the ground, see FIGS. 4, 7 and 7A.

Since the deflecting and directing of exhaust by the use of baffles could create a back pressure restriction, the bend line between plate portions is positioned at the start of conical portion 42. In this way, as each angled plate portion 41e and 41g is encountered by the vehicle exhaust, the cross sectional area of extension sleeve 41 is increasing. There is therefore a set off in terms of any slight restriction caused by the baffles 41a–41c by the increase in cross sectional area of the conical portion 42. The tips of each baffle extend beyond the outer edge of conical portion 42 such that there is no risk that deflected exhaust re-enters sleeve 30.

Ring 33 includes an outer annular ring 33b and an interior aperture ring 33c which is securely joined to ring 33b. Ring 33c includes a pattern of eighteen apertures 33a (see FIG. 9) which are covered by an interior flapper 44 (see FIG. 8). For a six-inch diameter nozzle 24, there are eighteen apertures. For an eight-inch diameter nozzle, a larger number of apertures are used, preferably twenty-three. The aperture 33a shape is preferably a D-shape to leave clearance for the clamping area for the flapper 44 without restricting the flow area. The flapper 44 is clamped in position by annular flange 45. The secure clamping of the flapper between ring 33c and flange 45 is achieved by spot welding the annular flange 45 directly to the outside diameter surface 35a of portion 35. Once flange 45 is spot welded directly, an assembly is created consisting of sleeve 30, ring 33, flapper 44, flange 45, and sleeve 41. Due to the offset portion 30a, ring 33 cannot move off of sleeve 30 in the direction of portion 34. Due to flange 45, the ring 33 cannot move in the direction of portion 35.

The inside diameter of nozzle end 28 is sized so as to easily slide over portion 42 with ample clearance (7/8 inch on a side) so as to avoid any interference. Two magnet packs (assemblies) are attached to the inside surface of nozzle end 28 which create magnetic attraction on the outer surface of portion 35. The method of attaching nozzle 24 onto the nozzle locator ring 33 is described hereinafter. In the context of the present invention, the exhaust extraction system connection assembly includes as the main components sleeve 30, nozzle locator ring 33, flapper 44, and nozzle assembly 24a.

Figure 5:
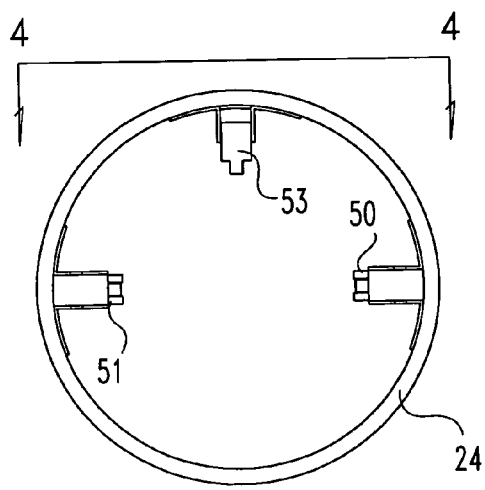
FIG. 5 is an end elevational view of the FIG. 2 nozzle assembly.
Figure 6A:
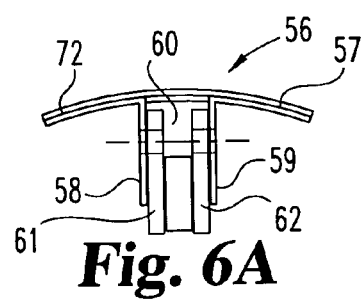
FIG. 6A is an end elevational view of the assembled FIG. 6 magnet pack.
Figure 6:
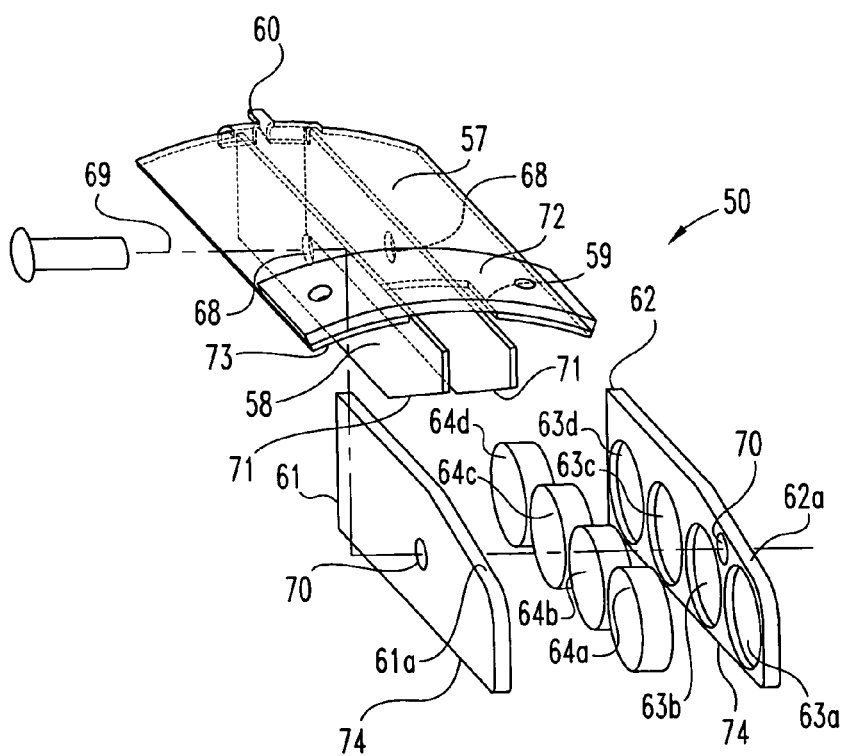
FIG. 6 is an exploded view of one magnet pack which comprises a portion of the FIG. 2 nozzle assembly as illustrated in FIG. 5.
Figure 8:
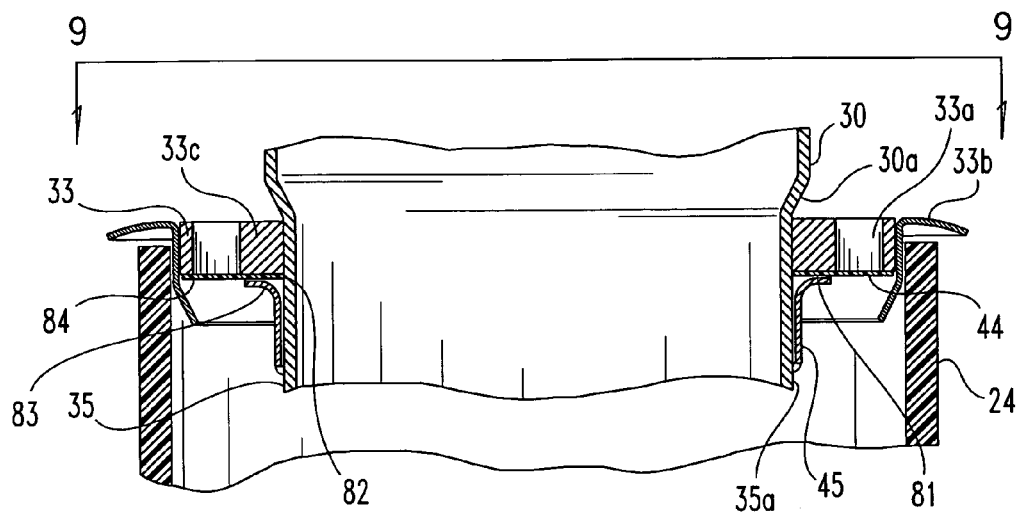
FIG. 8 is a side elevational view in full section of the nozzle locator ring of FIG. 3 illustrating its assembly onto the FIG. 3 sleeve.
Figure 9:
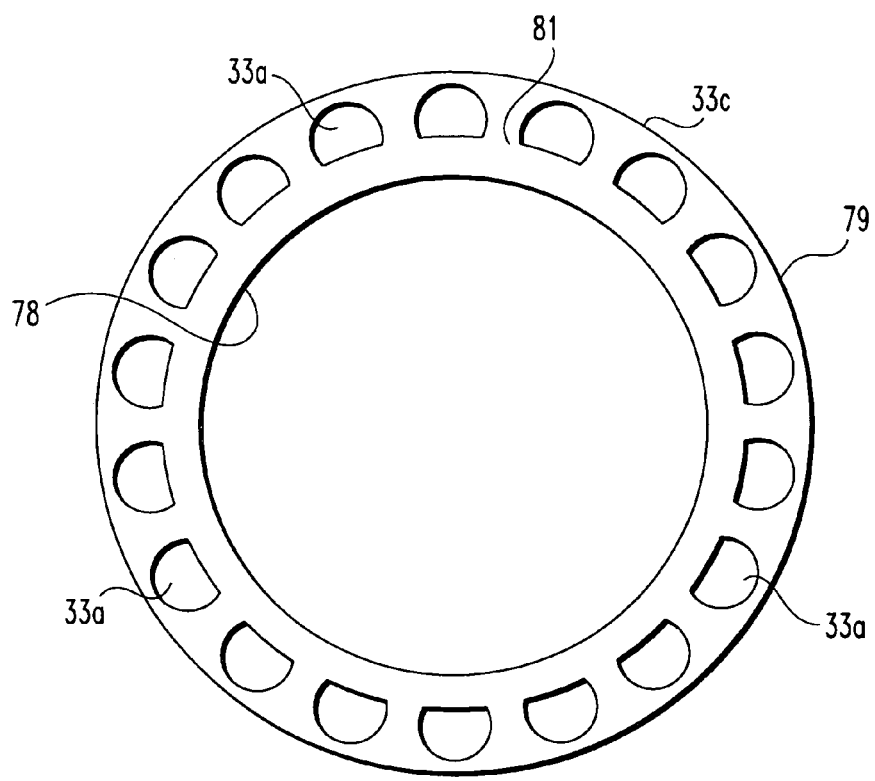
FIG. 9 is a top plan view of an annular ring component comprising one part of the nozzle locator ring of FIG. 8.

The final assembled condition of nozzle 24 (nozzle assembly 24a) onto nozzle locator ring 33 is illustrated in FIG. 4. The sleeve 41 has been turned ninety degrees so that the baffles can be illustrated in combination with the two magnet packs at 3 o'clock and 9 o'clock positions. As is illustrated, nozzle assembly 24a slides onto the nozzle locator ring 33 and nozzle end 28 fits snugly around body portion 48 of ring 33b and abuts up against the outer annular flange portion 49 of ring 33b. In this assembled orientation, end 32 and sleeve 41 are located in the hollow interior of nozzle 24. The two magnet packs 50 and 51 are located between portion 42 and ring 33b and establish magnetic attraction contact directly onto the outer cylindrical surface 35a of portion 35. The two magnet packs 50 and 51 are located approximately 180 degrees apart, see FIG. 5. Located between and at a location 90 degrees apart from the two magnet packs is a guide 53. Looking through nozzle 24 toward end 28 as depicted in FIG. 5, the two magnet packs 50 and 51 are at locations corresponding to the three o'clock and nine o'clock positions on the face of a clock. The guide 53 is located at the twelve o'clock position. The detailed construction of the ring 33, flapper 44, and flange 45 is illustrated in FIGS. 8 and 9. The detailed construction and assembly of one magnet pack 50 is illustrated in FIGS. 6, 6A, 7, and 7A. The other magnet pack 51 has a construction and assembly which is virtually identical to that illustrated for magnet pack 50.

With continued reference to FIGS. 6, 6A, 7, and 7A, it will be appreciated that magnet pack 50 includes a stainless steel case 56 which has a curved base 57, opposing side panels 58 and 59, and end panel 60. The interior defined by base 57 and panels 58–60 is hollow and designed to receive a plurality of magnets which are fixed in position by being sandwiched between a pair of opposing pole plates 61 and 62. Each pole plate 61 and 62 includes four spaced-apart, blind circular holes 63a–63d, each measuring approximately ⅝ inch in diameter and approximately 0.10 inches deep. Each of these blind holes 63a–63d is designed to receive and capture a corresponding cylindrical magnet 64a–64d. The hollow interior of case 56 is wide enough to accept a magnet subassembly which includes four magnets 64a–64d arranged side-by-side and sandwiched between plates 61 and 62 and fixed in spaced relation to one another by the four blind holes 63a–63d in each pole plate.

The opposing side panels 58 and 59 each define a pivot hole 68 which is aligned and centered on a corresponding pivot axis 69. Each pole plate 61 and 62 also includes a pivot hole 70 which is used in cooperation with a fastener to fix the magnet subassembly within case 56 and allow the magnet subassembly (pole plates 61 and 62 plus the four cylindrical magnets 64a–64d) to pivot relative to case 56. While the fit of the magnet subassembly within case 56 between side panels 58 and 59 is close, there is sufficient clearance in the width stack up of dimensions and tolerances for the magnet subassembly to be able to pivot freely without any interference or drag. The pole plates are made up of a magnetically-attractive material, while the case 56 is not magnetically attractive.

The leading edge 71 of each side panel 58 and 59 is inclined in the direction of curved base 57 which abuts up against the curved inside surface of end 28 of nozzle 24. The inclined taper of edge 71 creates a wider dimension clearance for conical portion 42 to slide past the two magnet packs 50 and 51. In order to also pivot the magnet subassembly away from the conical portion, a magnetically-attractive metallic piece 72 is attached to curved base 57 at a location adjacent to end 73. Each of the two pole plates 61 and 62 have a tapered edge 61a and 62a, respectively, which is provided as a way to facilitate the pivoting of the magnet subassembly toward metallic piece 72. This positions the innermost edge 74 of each pole plate on an incline. It is this inclined edge 74 which slides along the outermost edge 75 of conical portion 42 as the nozzle 24 is pushed onto the nozzle locator ring 33. By fabricating the extension sleeve 41 out of stainless steel, there is no magnetic attraction of the pole plates to the conical portion 42 as the pole plates (edges 74) slide across edge 75.

As the nozzle end 28 becomes fully seated on body portion 48 of ring 33b and abuts up against flange portion 49, the pole plates 61 and 62 have moved longitudinally to a point along portion 35 of sleeve 30 beyond the conical portion 42 of extension sleeve 41 and as this occurs, the pole plates 61 and 62 change from point contact to full area contact by the lower (innermost) edge 74 of each pole plate 61 and 62 against surface 35a of portion 35. With reference to a clock face or dial, the two magnet packs are located at three o'clock and nine o'clock positions based up on looking inwardly at the extension sleeve 41 from the direction of nozzle 24, see FIGS. 1 and 5.

The fully assembled combination of nozzle assembly 24a, nozzle locator ring 33, flapper 44, flange 45, sleeve 41, sleeve 30, and exhaust pipe 21 as described herein represents the exhaust extraction system configuration when the fire truck is parked and ready for a run. When a call comes in and the fire truck is started, exhaust is generated and flows from the exhaust pipe, through the sleeve 30, and exits by way of the nozzle assembly 24a and the remainder of the exhaust extraction system. As the truck pulls out of the fire house, the desire is to have the nozzle assembly disconnect from the nozzle locator ring 33 which remains securely connected to the vehicle exhaust pipe. As described, it may be desirable or necessary to shorten the original exhaust pipe to either reduce the length or to remove any angled or bent portions, or both.

When the fire truck leaves the fire house, the exhaust extraction system will ultimately place a tension force on the flexible hose. The force vectors are such due to the overhead arrangement of the extraction system, and in particular the ratchet balancer and track, that the nozzle will experience both an upward pulling force as well as rearward pulling force. The adjustable track stop releases the ratchet and the upward ratchet balancer spring bias force pulling on the end of the nozzle which is connected to the flexible hose pivots the magnets out of engagement with the exhaust pipe. This pivoting direction of separation is easier to accomplish than either full axial or lateral separation of the magnets due to the direction of the lines of flux and the relative ease or difficulty in breaking those lines of magnetic flux. The rocking or pivoting action allows the magnets to disengage quite easily and also clear conical portion 42, even though the pole pieces are in the down position. However, at the same time, if only axial forces were present, the force level required to separate the magnet housing from the exhaust pipe would be significant. Therefore, when the fire truck is moving forward, through a pass-through bay to the stand-by position or is backing into the stand-by position, the axial forces will have to break the contact before the pole pieces 61 and 62 will clear the conical edge 42 of sleeve 41. Also the turbocharger exhaust force would have to be able to break the axial force so that the pole pieces 61 and 62 can clear the conical portion 42 of sleeve 41 before the nozzle assembly 24a could be blown off of the exhaust pipe.

As the magnetic bond onto the exhaust pipe is broken, the axial force vectors pull the nozzle assembly off of the locator ring. This procedure allows the nozzle assembly to be securely retained at all times and yet separate easily when the fire truck is leaving the fire house.

When the truck returns to the fire house, the nozzle assembly 24a is being supported approximately two feet off the floor by the fully retracted ratchet balancer. To install the nozzle, the saddle is lowered and the balancer ratchet is set. Setting the ratchet removes the lifting spring bias pressure of the balancer on the nozzle. The nozzle assembly 24a can be readily reattached by locating the half moon cut outs in the exterior of nozzle 24 at approximately the 3, 9, and 12 o'clock positions. The cut outs engage the locator pins welded to portion 48 and position the magnet packs at 3 and 9 o'clock.

With further reference to FIGS. 8 and 9, the pattern of eighteen equally-spaced apertures 33a is coaxially between the inside diameter surface 78 of ring 33c and the outside diameter surface 79. The rubber flapper 44 lies across surface 81 so as to completely cover each aperture 33a. The inside diameter edge 82 of flapper 44 is clamped against surface 81 by the unitary annular flange 45. Flange 45 includes a compressing annular flange portion 83 and a cylindrical sleeve which fits around portion 35 and is spot welded to the outer surface 35a. As would be understood from this described and illustrated structure, the flapper 44 creates a one-way air flow restricter. Air flowing from the atmosphere into apertures 33a will push against flapper 44, causing it to deflect away from the apertures 33a and away from surface 81, thereby allowing the ambient air to enter the nozzle assembly 24a and subsequently blend with the exhaust exiting from the exhaust pipe 21. The blending of ambient air with the hot exhaust tends to lower the overall temperature of the exhaust which is being routed out of the fire house by the flexible hose 23. A lower overall temperature is easier on the nozzle and flexible hose and contributes to their longer life. Ambient air is drawn in through apertures 33a whenever the blower of the exhaust extraction system starts. Ambient air may also be drawn in through any pressure differences, and prevent turbo spinning when the blower is running but the truck engine is not. A possible venturi effect of exhaust flowing from the exhaust pipe may also introduce ambient air.

In the reverse direction, any air or exhaust gas which might tend to backflow from the nozzle back to the atmosphere will be blocked by flapper 44. The flow of air or exhaust gas inside of nozzle assembly 24a will simply push against the flapper, pushing it back toward apertures 33a and outer edge 84 up against surface 81. The flexibility of the rubber flapper 44 enables it to seal up against the apertures 33a and/or up against surface 81, preventing any backflow out through the apertures 33a.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. An extension sleeve for use as part of an exhaust extraction system that is constructed and arranged to vent exhaust from a vehicle exhaust pipe, said exhaust extraction system including an annular sleeve constructed and arranged to assemble onto said vehicle exhaust pipe, said extension sleeve being inserted into said annular sleeve and rotatable therein, said extension sleeve comprising:
   a cylindrical portion and a conical portion adjacent an end of said cylindrical portion, said conical portion flaring radially outwardly as it extends away from said cylindrical portion;
   a plurality of baffles assembled into said cylindrical portion, each baffle of said plurality of baffles including a body portion, an angled plate portion, and a bend line positioned between said body portion and said angled plate portion; and
   said conical portion having a starting location at said end and said bend line being positioned at said starting location.

2. The extension sleeve of claim 1 wherein said angled plate portion is inclined at least 25 degrees.

3. The extension sleeve of claim 2 wherein each baffle of said plurality of baffles is fixed in position relative to said extension sleeve.

4. The extension sleeve of claim 3 wherein there is a total of three baffles, said three baffles being equally-spaced apart.

5. The extension sleeve of claim 1 wherein rotation of said extension sleeve changes the deflecting and directing direction of the exhaust via said plurality of baffles.

6. The extension sleeve of claim 1 wherein said extension sleeve is arranged relative to said vehicle exhaust pipe so as to cause said plurality of baffles to deflect and direct the exhaust in a rearward and downward direction.

* * * * *